US010558499B2

United States Patent
Kazakov et al.

(10) Patent No.: US 10,558,499 B2
(45) Date of Patent: Feb. 11, 2020

(54) WAVE CREATION CONTROL WITH DYNAMIC RESOURCE ALLOCATION

(71) Applicant: ADVANCED MICRO DEVICES, INC., Sunnyvale, CA (US)

(72) Inventors: Maxim V. Kazakov, San Diego, CA (US); Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 40 days.

(21) Appl. No.: 15/794,593

(22) Filed: Oct. 26, 2017

(65) Prior Publication Data

US 2019/0129756 A1 May 2, 2019

(51) Int. Cl.
  *G06F 9/50* (2006.01)

(52) U.S. Cl.
  CPC .................. *G06F 9/5027* (2013.01)

(58) Field of Classification Search
  CPC ..................................... G06F 9/5027
  USPC ........................................ 718/104
  See application file for complete search history.

(56) References Cited

U.S. PATENT DOCUMENTS

| | | | |
|---|---|---|---|
| 7,653,905 B1* | 1/2010 | Lingamneni | G06F 9/4843 718/100 |
| 2005/0108714 A1 | 5/2005 | Geye et al. | |
| 2010/0153959 A1 | 6/2010 | Song et al. | |
| 2011/0055838 A1* | 3/2011 | Moyes | G06F 9/4881 718/102 |
| 2012/0096153 A1 | 4/2012 | Weiser et al. | |
| 2012/0143992 A1* | 6/2012 | Salamatov | G06F 9/5027 709/219 |
| 2012/0216210 A1 | 8/2012 | Armstrong et al. | |
| 2014/0259024 A1 | 9/2014 | Sridharan et al. | |
| 2015/0143092 A1* | 5/2015 | Senda | G06F 9/4405 713/1 |
| 2016/0117200 A1* | 4/2016 | Alexander | G06F 9/5077 718/102 |

OTHER PUBLICATIONS

Jesse Storimer; "How Many Threads is Too Many?"; jstormirer.com webpage [full url in ref.]; May 26, 2013 (Year: 2013).*
Eugen Paraschiv; "Finally Getting the Most out of the Java Thread Pool"; Stackify.com webpage [full url in ref.]; Sep. 6, 2017 (Year: 2017).*
Brendan Gregg; "CPU Utilization is Wrong"; brendangregg.com webpage [full url in ref.]; May 9, 2017 (Year: 2017).*
"Moving Average"; Wikipedia.org; Oct. 12, 2017 (Year: 2017).*

(Continued)

*Primary Examiner* — Qing Chen
*Assistant Examiner* — Clint Thatcher (57) ABSTRACT

Footprints, or resource allocations, of waves within resources that are shared by processor cores in a multi-threaded processor are measured concurrently with the waves executing on the processor cores. The footprints are averaged over a time interval. A number of waves are spawned and dispatched for execution in the multithreaded processor based on the average footprint. In some cases, the waves are spawned at a rate that is determined based on the average value of the footprints of waves within the resources. The rate of spawning waves is modified in response to a change in the average value of the footprints of the waves within the resources.

20 Claims, 7 Drawing Sheets

(56) References Cited

OTHER PUBLICATIONS

Goossens et al.; "Priority-driven scheduling of periodic task systems on multiprocessors"; Real-Time Systems, 25, 187-205; 2003 (Year: 2003).*
International Search Report and Written Opinion dated Jan. 15, 2019 for corresponding International Application No. PCT/US2018/052840, 13 pages.

* cited by examiner

WAVE CREATION CONTROL WITH
DYNAMIC RESOURCE ALLOCATION

BACKGROUND

Graphics processing units (GPUs) and other multi-threaded processing units typically implement multiple processing elements (which are also referred to as processor cores or compute units) that concurrently execute multiple instances of a single program on multiple data sets. The instances are referred to as threads or waves. Several waves are created (or spawned) and then dispatched to each processing element in a multi-threaded processing unit. The processing unit can include hundreds of processing elements so that thousands of waves are concurrently executing programs in the processing unit. The processing elements in a GPU typically process three-dimensional (3-D) graphics using a graphics pipeline formed of a sequence of programmable shaders and fixed-function hardware blocks. For example, a 3-D model of an object that is visible in a frame can be represented by a set of primitives such as triangles, other polygons, or patches which are processed in the graphics pipeline to produce values of pixels for display to a user. In a multithreaded GPU, the waves execute different instances of the shaders to perform calculations on different primitives concurrently or in parallel. Waves that are executing concurrently in a multithreaded processing unit share some of the resources of the processing unit. Shared resources include vector general-purpose registers (VGPRs) that store state information for the waves, local data shares (LDSs) that are used to store data for the waves, bandwidth available to move information between a local cache hierarchy and a memory, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The number of waves that are concurrently executed by a multithreaded processing unit is limited by the availability of the shared resources. Conventional wave spawning techniques assume that all the waves require the same resource allocation (which is also referred to herein as the footprint of the wave) and further require that the footprint of the wave remains constant as the wave executes. The number of waves that are dispatched for concurrent execution is determined by comparing the assumed static footprint to the total available resources. The actual footprint of a wave typically differs from the assumed static footprint and the wave's footprint typically varies as the wave is being executed, which leads to an inefficient allocation of resources to waves. For example, if the static footprint per wave is assumed to have a maximal value that is larger than or equal to the actual footprint of any individual wave, the waves that are concurrently executing on the multithreaded GPU consume less than all of the available resources. For another example, if the footprint per wave is assumed to have a minimal value that is less than or equal to the footprints of the waves as they are being executed, execution of the waves becomes serialized as the waves compete for the same resources, which reduces or eliminates the degree of latency hiding that is achieved by executing the waves in parallel. Serialization occurs when a memory bandwidth used by a wave exceeds the memory unit bandwidth available divided by the number of executing waves.

Utilization of shared resources of a multithreaded processor (such as a GPU) is increased, while also avoiding serialization due to competition for the shared resources, by measuring footprints of waves that are sharing resources while executing the waves on the multithreaded processor. The measured footprints of the waves are averaged over a time interval to determine an average footprint for the waves. A number of waves that are subsequently dispatched for execution in the multithreaded processor (or a rate of spawning waves for execution) is determined based on the average footprint. For example, the number of waves that are dispatched for concurrent execution on the multithreaded processor can be set equal to the available shared resources divided by the average footprint. In some embodiments, the average footprint is determined using a moving average such as an exponentially weighted moving average of footprints of waves that have been dispatched for concurrent execution on the multithreaded processor. Footprints of waves can be measured when the wave is created, when the shared resources are allocated to the wave, when the shared resources are deallocated, during each processor cycle, after a predetermined number of cycles have completed, or at any other time or time interval. A single average footprint is determined by averaging over all of the dispatched waves or multiple average footprints are determined for subsets of the dispatched waves. The subsets are determined based on common characteristics of the dispatched waves such as waves running on single-instruction-multiple-data (SIMD), waves that have completed execution, waves that are executing different types of shaders, and the like.

Figure 1:
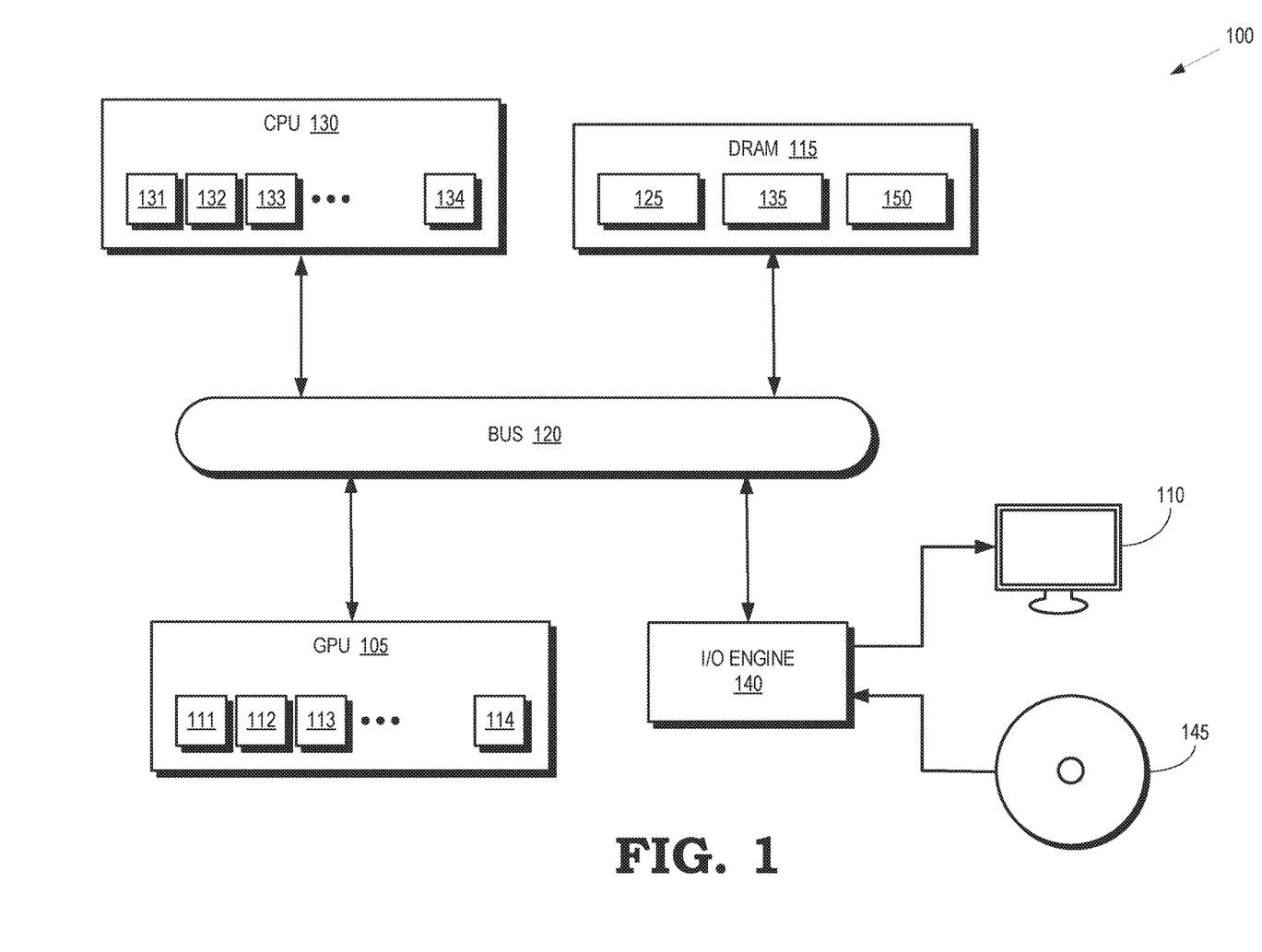
FIG. 1 is a block diagram of a processing system that includes a graphics processing unit (GPU) for creating visual images intended for output to a display according to some embodiments.

FIG. 1 is a block diagram of a processing system 100 that includes a graphics processing unit (GPU) 105 for generating visual images intended for output to a display 110 according to some embodiments. The GPU 105 is a multi-threaded processor that includes a plurality of processor cores 111, 112, 113, 114, which are collectively referred to herein as "the processor cores 111-114." The processor cores 111-114 are configured to execute instructions concurrently or in parallel. Although four processor cores 111-114 are shown in FIG. 1 in the interest of clarity, some embodiments of the GPU 105 include tens or hundreds or more processor cores. The processing resources of the processor cores 111-114 are used to implement a graphics pipeline that renders images of objects for presentation on the display 110. Some embodiments of the processor cores 111-114 concurrently execute multiple instances (or waves) of a single program on multiple data sets. Wave spawning control logic in the GPU 105 spawns waves for execution on the processor cores 111-114 based on dynamically determined wave footprints, as discussed herein.

The processing system 100 includes a memory 115. Some embodiments of the memory 115 are implemented as a dynamic random access memory (DRAM). However, the memory 115 can also be implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 can execute instructions stored in the memory 115 and the GPU 105 can store information in the memory 115 such as the results of the executed instructions. For example, the memory 115 can store a copy 125 of instructions from a program code that is to be executed by the processor cores 111-114 in the GPU 105.

The processing system 100 includes a central processing unit (CPU) 130 for executing instructions. Some embodiments of the CPU 130 include multiple processor cores 131, 132, 133, 134 (collectively referred to herein as "the processor cores 131-134") that can independently execute instructions concurrently or in parallel. The CPU 130 is also connected to the bus 120 and can therefore communicate with the GPU 105 and the memory 115 via the bus 120. The CPU 130 can execute instructions such as program code 135 stored in the memory 115 and the CPU 130 can store information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). Some embodiments of a draw call include information defining textures, states, shaders, rendering objects, buffers, and the like that are used by the GPU 105 to render the object or portion thereof. The information included in the draw call can be referred to as a state vector that includes state information. The GPU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 is able to communicate with the GPU 105, the memory 115, or the CPU 130. In the illustrated embodiment, the I/O engine 140 is configured to read information stored on an external storage medium 145, such as a compact disk (CD), a digital versatile disc (DVD), a networked server, and the like. The external storage medium 145 stores information representative of program code used to implement an application such as a video game. The program code on the external storage medium 145 can be written to the memory 115 to form the copy 125 of instructions that are to be executed by the GPU 105 or the program code 135 that is to be executed by the CPU 130.

The processor cores 111-114 in the multithreaded GPU 105 share resources that are used to support execution of waves in the GPU 105. Some embodiments of the GPU 105 implement a set of vector general-purpose registers (VGPR, not shown in FIG. 1 in the interest of clarity) that store state information for the waves that are executing on the processor cores 111-114. The VGPRs are shared between the waves that are concurrently executing on the processor cores 111-114. For example, each wave is allocated a subset of the VGPRs to store state information for the wave. The waves also share other resources of the GPU 105 including a local data share that is partitioned among the concurrently executing waves, memory bandwidth that is shared by the waves for accessing local caches, and the like. The processor cores 131-134 in the multithreaded CPU 130 also share resources. Wave spawning and dynamic allocation of shared resources, as discussed below in the context of the GPU 105, is also implemented in some embodiments of the multithreaded CPU 130.

Different waves consume different amounts of resources while executing on the processor cores 111-114. The waves therefore have different resource footprints. Furthermore, the resources consumed by a wave typically change during the course of execution of the waves. For example, the number of VGPRs that are needed to store the state information for a wave changes as the wave is executing. The volume of intermediate results generated by the wave typically increases as the wave begins execution, reaches a peak during execution of the wave, and then decreases as the wave completes executing. Thus, the number of VGPRs that are needed to store the intermediate results (as well as other state information) increases, reaches a peak, and then decreases in accordance with the volume of information that needs to be stored. Similar patterns are also observed in the consumption of other resources including the local data shares and memory bandwidth.

The GPU 105 spawns waves for execution on the processor cores 111-114 based on a dynamic estimation of the footprints of waves within the shared resources of the GPU 105. The footprints of the waves within the shared resources are measured concurrently with the waves executing on the processor cores 111-114. The measured footprints for the waves are averaged over a time interval, e.g., using an exponentially weighted moving average of the measured footprints. A number of waves are spawned and dispatched for execution by the processor cores 111-114 based on the average footprint. For example, the number of waves that are spawned can be set equal to the available shared resources divided by the average footprint. The available shared resources are equal to the total shared resources minus the shared resources that are allocated to waves that are currently executing on the processor cores 111-114.

In some cases, the GPU 105 spawns the waves at a rate that is determined based on the average value of the footprints of waves within the shared resources. The GPU 105 modifies the rate of spawning waves in response to a change in the average value of the footprints of the waves within the resources. The GPU 105 can determine the number of waves that are spawned (or the rate of spawning waves) based on an average footprint within a single resource that is considered a bottleneck in the processing system 100 or the GPU 105 can determine the number of waves based on combinations of average footprints within multiple shared resources.

Figure 2:
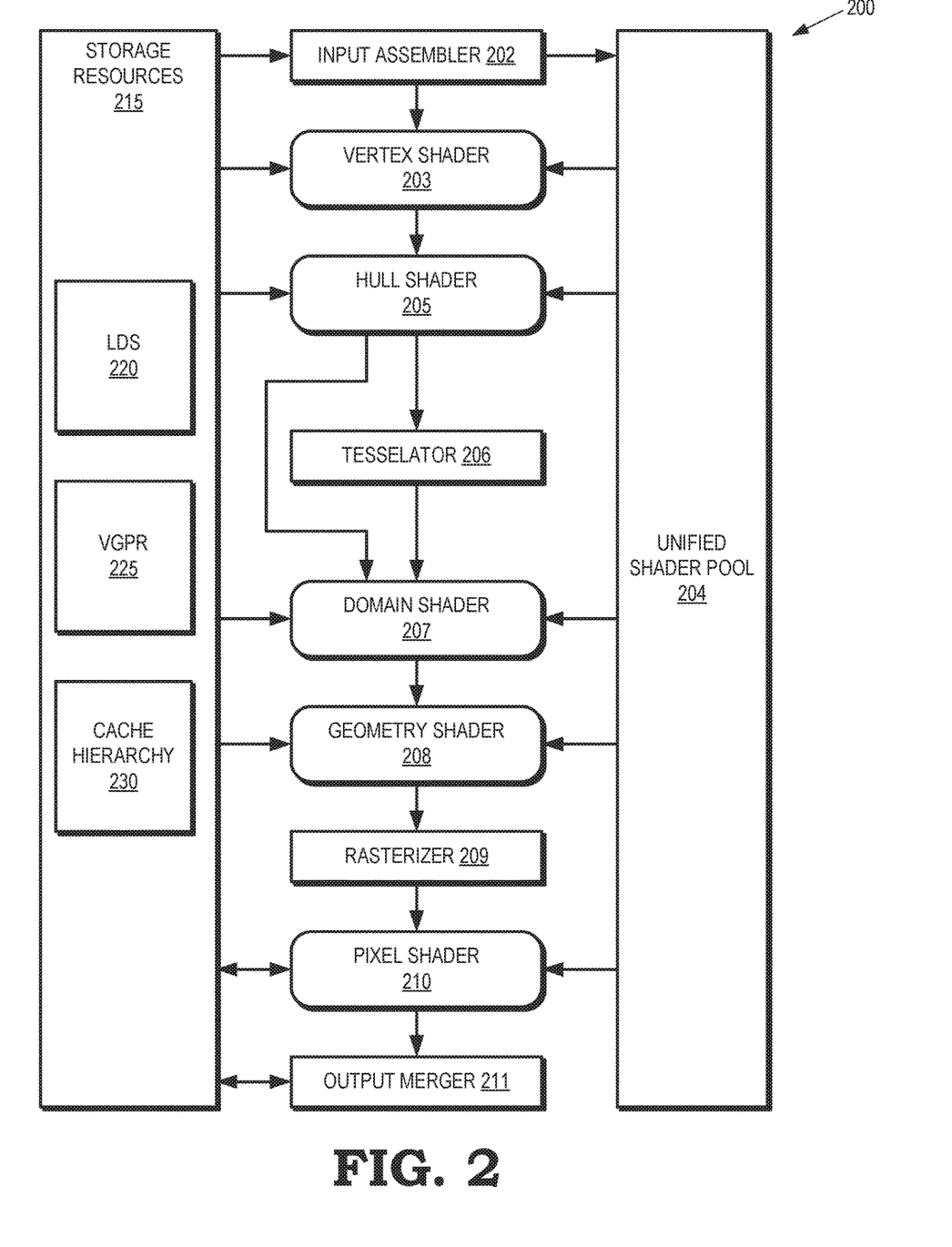
FIG. 2 depicts a graphics pipeline that is capable of processing high-order geometry primitives to generate rasterized images of three-dimensional (3-D) scenes according to some embodiments.

FIG. 2 depicts a graphics pipeline 200 that is capable of processing high-order geometry primitives to generate rasterized images of three-dimensional (3-D) scenes according to some embodiments. The graphics pipeline 200 is implemented in some embodiments of the GPU 105 shown in FIG. 1. For example, the graphics pipeline 200 can be implemented using the processor cores 111-114 in the multithreaded GPU 105 shown in FIG. 1.

The graphics pipeline 200 includes an input assembler 202 that is configured to access information from the storage resources 201 that is used to define objects that represent portions of a model of a scene. A vertex shader 203, which can be implemented in software, logically receives a single vertex of a primitive as input and outputs a single vertex. Some embodiments of shaders such as the vertex shader 203 implement massive single-instruction-multiple-data (SIMD) processing so that multiple vertices can be processed concurrently, e.g., by the processor cores 111-114 shown in FIG. 1. The graphics pipeline 200 shown in FIG. 2 implements a unified shader model so that all the shaders included in the graphics pipeline 200 have the same execution platform on the shared massive SIMD compute units. The shaders, including the vertex shader 203, are therefore implemented using a common set of resources that is referred to herein as the unified shader pool 204. Some embodiments of the unified shader pool 204 are implemented using the processor cores 111-114 in the GPU 105 shown in FIG. 1.

A hull shader 205 operates on input high-order patches or control points that are used to define the input patches. The hull shader 205 outputs tessellation factors and other patch data. Primitives generated by the hull shader 205 can optionally be provided to a tessellator 206. The tessellator 206 receives objects (such as patches) from the hull shader 205 and generates information identifying primitives corresponding to the input object, e.g., by tessellating the input objects based on tessellation factors provided to the tessellator 106 by the hull shader 205. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive.

A domain shader 207 inputs a domain location and (optionally) other patch data. The domain shader 207 operates on the provided information and generates a single vertex for output based on the input domain location and other information. A geometry shader 208 receives an input primitive and outputs up to four primitives that are generated by the geometry shader 208 based on the input primitive. One stream of primitives is provided to a rasterizer 209 and up to four streams of primitives can be concatenated to buffers in the storage resources 201. The rasterizer 209 performs shading operations and other operations such as clipping, perspective dividing, scissoring, and viewport selection, and the like. A pixel shader 210 inputs a pixel flow and outputs zero or another pixel flow in response to the input pixel flow. An output merger block 211 performs blend, depth, stencil, or other operations on pixels received from the pixel shader 210.

The stages of the graphics pipeline 200 are able to access storage resources 215 that are shared by the waves being executed by the different stages using the processing resources in the unified shader pool 204. Portions of the storage resources 215 are implemented on-chip as part of the GPU 105 shown in FIG. 1 or off-chip using some embodiments of the memory 115 shown in FIG. 1. The storage resources 215 include an LDS 220 that is used for read/write communication and synchronization within a workgroup of multiple waves. The storage resources 215 also include VGPR 225 that store state information that define the current state of the waves, such as intermediate results of operations that have been performed by the waves. The storage resources 215 further include a cache hierarchy 230 that is used to cache information such as vertex data, texture data, and other data that is frequently used by one or more of the stages of the graphics pipeline 200. The storage resources 215 can also include other registers, buffers, memories, or caches. The shared resources of the graphics pipeline 200 also include bandwidth in the memory fabric that is used to support communication between the stages of the graphics pipeline 200 and the storage resources 215.

Waves that are executing in the graphics pipeline 200 have different footprints in the storage resources 215 and other shared resources of the graphics pipeline 200. For example, a wave that is used to shade a highly detailed foreground portion of an image may have a larger footprint in the shared resources than a wave that is used to shade a less detail background portion of an image. The footprint of a wave also changes as it passes along the graphics pipeline 200. For example, the footprint of a wave in the shared resources can begin at a first (relatively small) value while it is executing in the vertex shader 203 and then the footprint of the wave can increase as the wave generates additional intermediate results in subsequent stages of the graphics pipeline 200. Wave spawning control logic is therefore configured to spawn waves for execution in the graphics pipeline 200 based on a dynamic estimation of the footprints of waves within the LDS 220, VGPR 225, cache hierarchy 230, memory bandwidth used to access the storage resources 215, and other shared resources.

Figure 3:
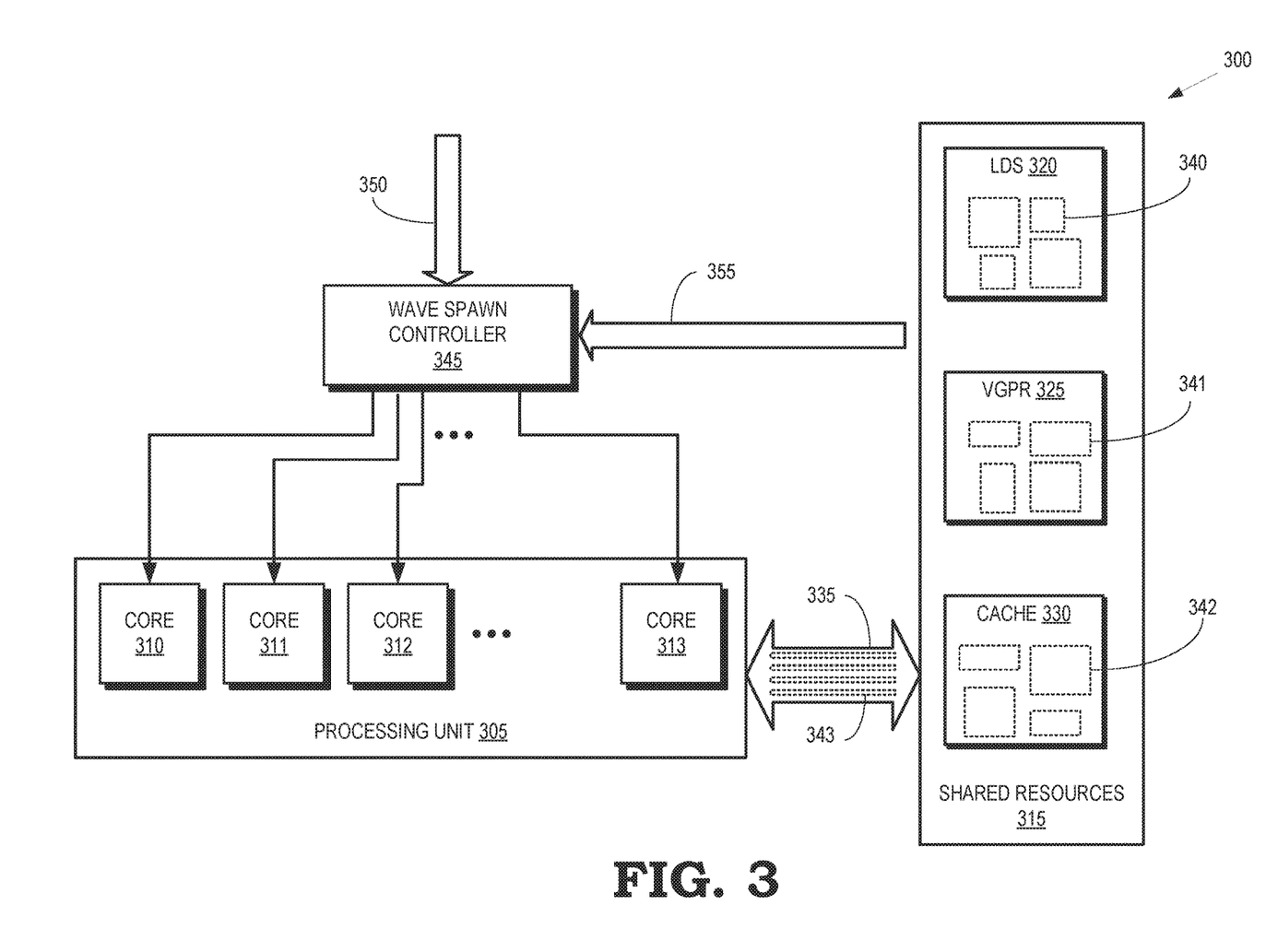
FIG. 3 is a block diagram of a portion of a processing system that supports wave creation based on dynamic allocation of shared resources according to some embodiments.

FIG. 3 is a block diagram of a portion 300 of a processing system that supports wave creation based on dynamic allocation of shared resources according to some embodiments. The portion 300 is used to implement some embodiments of the processing system 100 shown in FIG. 1. For example, the portion 300 includes a multithreaded processing unit 305 that is used to implement some embodiments of the GPU 105 or the CPU 130 shown in FIG. 1. The processing unit 305 includes a plurality of processor cores 310, 311, 312, 313, which are collectively referred to herein as "the processor cores 310-313." The processor cores 310-313 share a set of resources 315 that includes an LDS 320, a VGPR 325, and a cache 330. The processor core 310-313 also share a memory bandwidth of a connection 335 between the processing unit 305 and the shared resources 315.

Waves executing on the processor core 310-313 have different footprints within the shared resources 315. For example, a first wave has a footprint 340 in the LDS 320, a footprint 341 in the VGPR 325 and a footprint 342 in the cache 330. The first wave also has a footprint 343 and the memory bandwidth that is available in the connection 335. The footprints 340-343 of the waves in the shared resources are measured concurrently with the waves executing on the processor cores 310-313. For example, the footprint 340 can be measured as a number of bytes that are allocated to the first wave at a particular time, the footprint 341 can be measured as a number of registers that are allocated to the first wave at the particular time, and the footprint 342 can be measured as a number of cache entries that are allocated to the first wave at the particular time. The footprint 343 in the connection 335 can be measured or estimated based on a number of cache fetches or misses associated with the first wave at the particular time. Other measures of the footprints 340-343 (or footprints in other shared resources) can also be used.

Multiple measurements of the footprints 340-343 are performed over time for each of the waves. The measurements can be performed when the waves are created, whenever resources are allocated to the waves, and whenever resources are deallocated from the waves. The footprints 340-343 of the waves can also be measured at time intervals corresponding to a predetermined number of execution cycles. For example, the footprints 340-343 can be measured once per execution cycle, once per N execution cycles, or after other subsets of the execution cycles. Each wave is therefore associated with a set of measurements that indicates the changes in the footprints 340-343 of the wave within the shared resources over time.

A wave spawn controller 345 creates new waves and dispatches them to the processor cores 310-313 on the basis of average values of the measured footprints 340-343. Some embodiments of the wave spawn controller 345 receive information 350 indicating the instructions or operations that are to be executed in the waves and information 355 indicating the measured values of the footprints 340. The wave spawn controller 345 generates an average value of the measured footprints 340-343 over a particular time interval. Some embodiments of the wave spawn controller 345 generate the average value over a trailing time interval relative to a reference time, e.g., as an exponentially weighted moving average. Different average values can be generated for subsets of the waves. For example, average values of the footprint 340-343 can be generated for a subset of the waves that include single-instruction-multiple-data operations, a subset of waves that have completed execution, a subset of waves corresponding to a type of shader executing the waves, and the like.

The wave spawn controller 345 dispatches a number of waves (or dispatches the waves at a rate) that is determined based on the average value of the footprints 340-343. For example, the number of, or rate of, waves that are spawned subsequent to the reference time used to determine the trailing time interval is determined based on the average value. The wave spawn controller 345 is also configured to modify the number of waves that are spawned (or the rate at which the waves are spawned) in response to a change in the moving average relative to a previous moving average over a previous trailing time interval. For example, the waves can be spawned at a higher rate in response to the moving average decreasing, which indicates that more of the shared resources 315 are available for allocation to other waves. For another example, the waves can be spawned a lower rate in response to the moving average increasing, which indicates that fewer of the shared resources are available for allocation to other waves.

Some embodiments of the wave spawn controller 345 determine different numbers of waves that are spawned (or different rates of spawning waves) for different subsets of waves based on the average footprints calculated for the subsets. For example, the wave spawn controller 345 can spawn different numbers of waves (or spawn waves at different rates) based on average values for subsets of the waves that include single-instruction-multiple-data operations, subsets of waves that have completed execution, subsets of waves corresponding to different types of shaders executing the waves, and the like.

Figure 4:
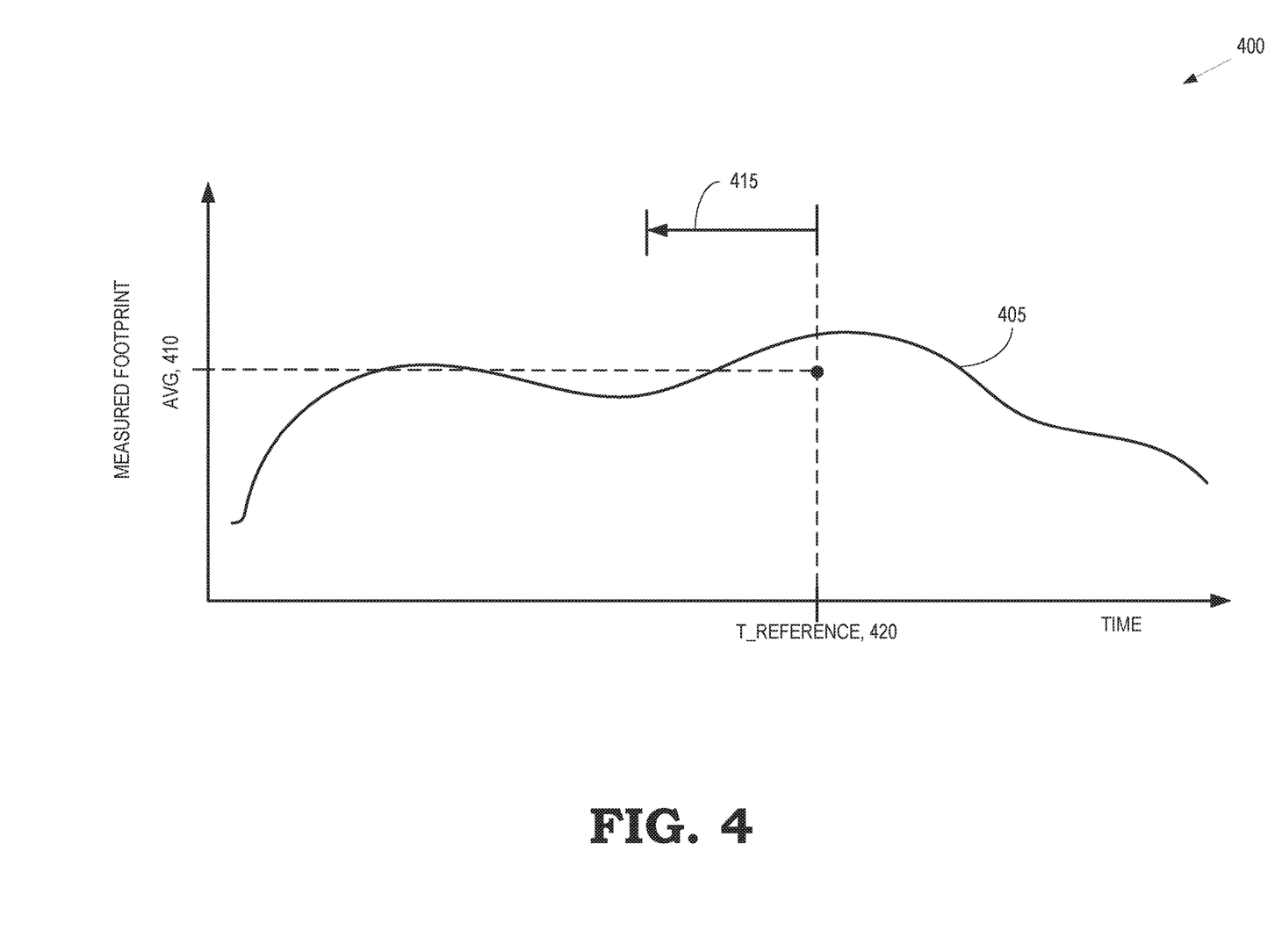
FIG. 4 is a plot of a measured footprint of a wave in a shared resource as a function of time according to some embodiments.

FIG. 4 is a plot 400 of a measured footprint 405 of a wave in a shared resource as a function of time according to some embodiments. The measured footprint 405 is illustrated as a continuous line in FIG. 4. However, in some embodiments the measured footprint 405 is formed of multiple discrete measurements at particular time intervals such as a time interval corresponding to a predetermined number of execution cycles. Initially, the measured footprint 405 begins at a relatively low value and subsequently increases (or decreases) as execution of the wave proceeds. A moving average 410 of the measured footprint 405 is calculated using measurements performed during a trailing time interval 415 relative to a reference time 420. For example, the moving average 410 can be an exponentially weighted moving average that is computed using measurements that are performed during the trailing time interval 415. The reference time 420 can correspond to a current time or the reference time 420 can be selected to occur at predetermined time intervals.

Figure 5:
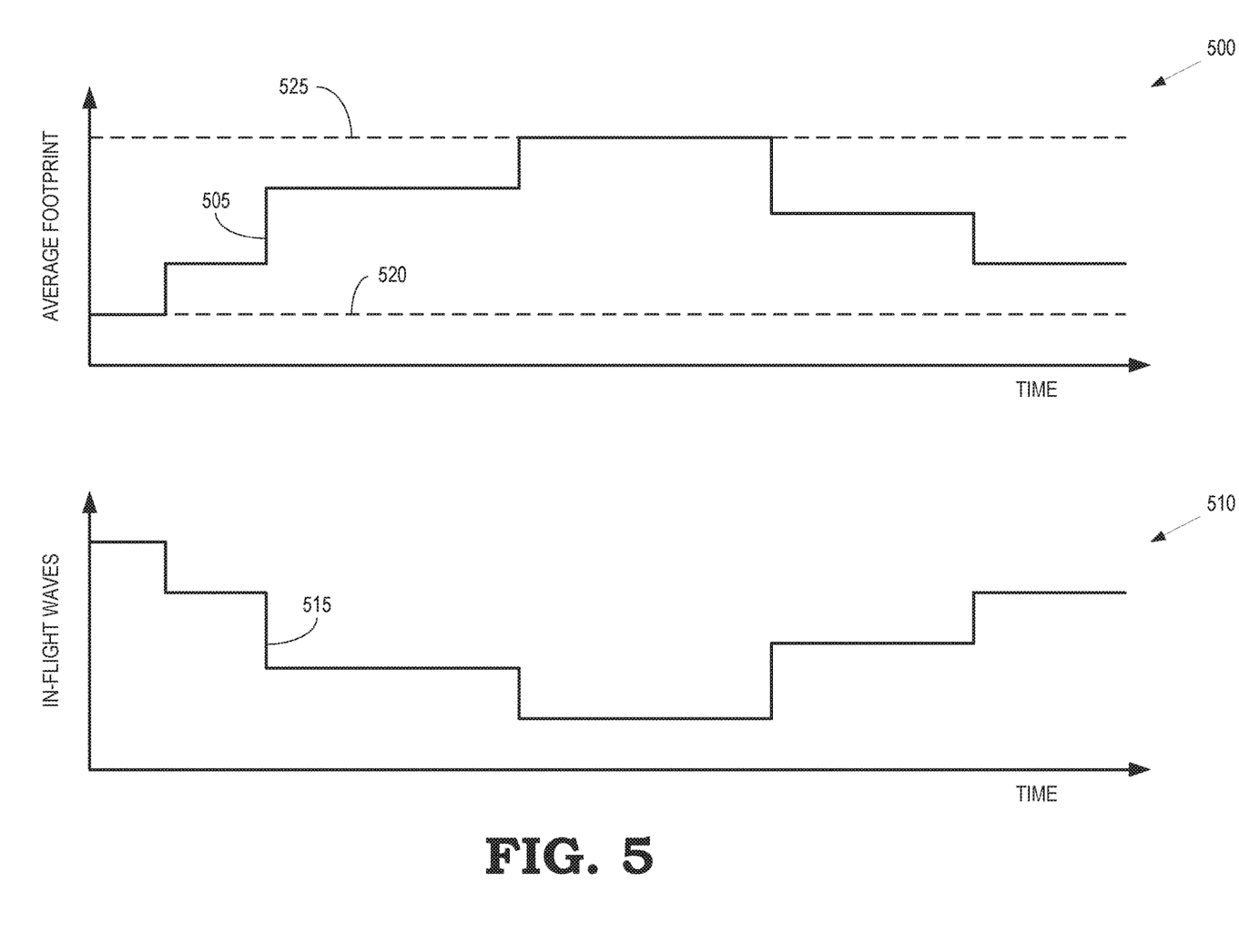
FIG. 5 includes a plot of an average footprint of waves within a shared resource and a plot of a number of in-flight waves in a multithreaded processing unit according to some embodiments.

FIG. 5 includes a plot 500 of an average footprint 505 of waves within a shared resource and a plot 510 of a number 515 of in-flight waves in a multithreaded processing unit according to some embodiments. The average footprint 505 is determined based on measurements of footprints of waves concurrently with the waves executing on processor cores in the multithreaded processing unit, as discussed herein. A controller then determines the number 515 of in-flight waves based on the average footprint 505. As used herein, the term "in-flight wave" refers to a wave that has been spawned and dispatched for execution on a processor core in the multithreaded processing unit but which has not yet been retired. The number 515 of in-flight waves is therefore determined by a number of waves that are spawned by a controller or the rate at which the controller spawns new waves.

The plot 500 shows a minimum average footprint 520 that is initially assumed to be the footprint within the shared resources occupied by each of the waves. The plot 500 also shows a maximum average footprint 525 that represents the largest amount of shared resources that are to be allocated to an individual wave. The controller spawns waves based upon the current value of the average footprint. The plot 510 shows that the number 515 of in-flight waves is initially relatively high because the average footprint used to determine the number of waves that are spawned (or the rate at which the waves are spawned) is equal to the minimum average footprint 520. The number 515 of in-flight waves decreases in response to the average footprint 505 increasing, until the average footprint 505 reaches the maximum value 525. The number 515 of in-flight waves then increases in response to the average footprint 505 decreasing.

Figure 6:
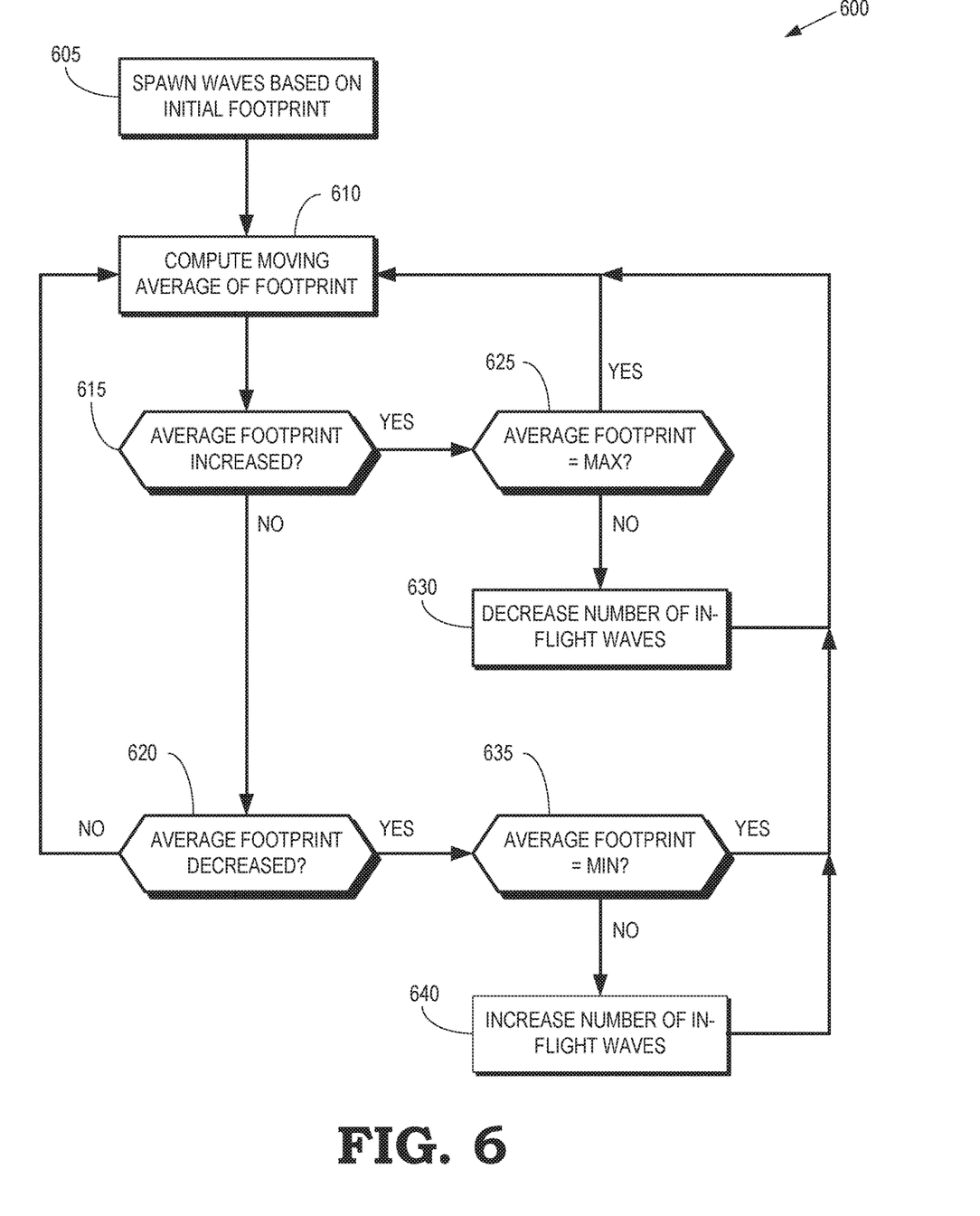
FIG. 6 is a flow diagram of a method for controlling wave creation based on averages of footprints of waves executing in a multithreaded processing unit according to some embodiments.

FIG. 6 is a flow diagram of a method 600 for controlling wave creation based on averages of footprints of waves executing in a multithreaded processing unit according to some embodiments. The method 600 is implemented in some embodiments of the computing system 100 shown in FIG. 1 and the portion 300 of the computing system shown in FIG. 3. Although the method 600 shown in FIG. 6 determines an average footprint in a shared resource for waves executing in the multithreaded processing unit, some embodiments of the method 600 determine average footprints for multiple shared resources, different subsets of waves, and the like.

At block 605, a controller spawns waves for execution in the multithreaded processing unit based on an initial footprint. In some embodiments, the initial footprint is set to a minimum average footprint. The controller continues to spawn a number of waves (or spawn waves at a rate) that is determined based upon the initial footprint.

At block 610, a moving average of the footprints of the waves that are executing in the multithreaded processing unit is determined. Footprints of the individual waves in the shared resources are measured and then the measured footprints are used to calculate the moving average. For example, the moving average can be determined using measurements of the footprints that are performed over a trailing time interval relative to a reference time.

At decision block 615, the controller determines whether the average footprint has increased. If not, the method 600 flows to decision block 620. If the average footprint has increased, the method 600 flows to decision block 625 and the controller determines whether the average footprint is equal to a maximum footprint. If the average footprint is equal to the maximum footprint, the method 600 flows back to block 610 and the controller continues to calculate the moving average based on newly acquired measurements of the footprints. The controller therefore continues to spawn the number of waves (or spawn waves at the rate) that is determined based upon the maximum footprint. If the average footprint is not equal to the maximum footprint, the method 600 flows to block 630. In response to the average footprint increasing, the controller decreases the number of in-flight waves at block 630, e.g., by decreasing the number of waves that are spawned or by decreasing the rate of spawning the waves.

At decision block 620, the controller determines whether the average footprint has decreased. If not, the method 600 flows to block 610. The controller therefore continues to spawn the number of waves (or spawn waves at the rate) that was determined based on the previous (and unchanged) average footprint. If the average footprint has decreased, the method 600 flows to decision block 635 and the controller determines whether the average footprint is equal to a minimum footprint. If the average footprint is equal to the minimum footprint, the method 600 flows back to block 610 and the controller continues to calculate the moving average based on newly acquired measurements of the footprints. The controller therefore continues to spawn the number of waves (or spawn waves at the rate) that is determined based upon the minimum footprint. If the average footprint is not equal to the minimum footprint, the method 600 flows to block 640. In response to the average footprint decreasing, the controller increases the number of in-flight waves at block 640, e.g., by increasing the number of waves that are spawned or by increasing the rate of spawning the waves.

Figure 7:
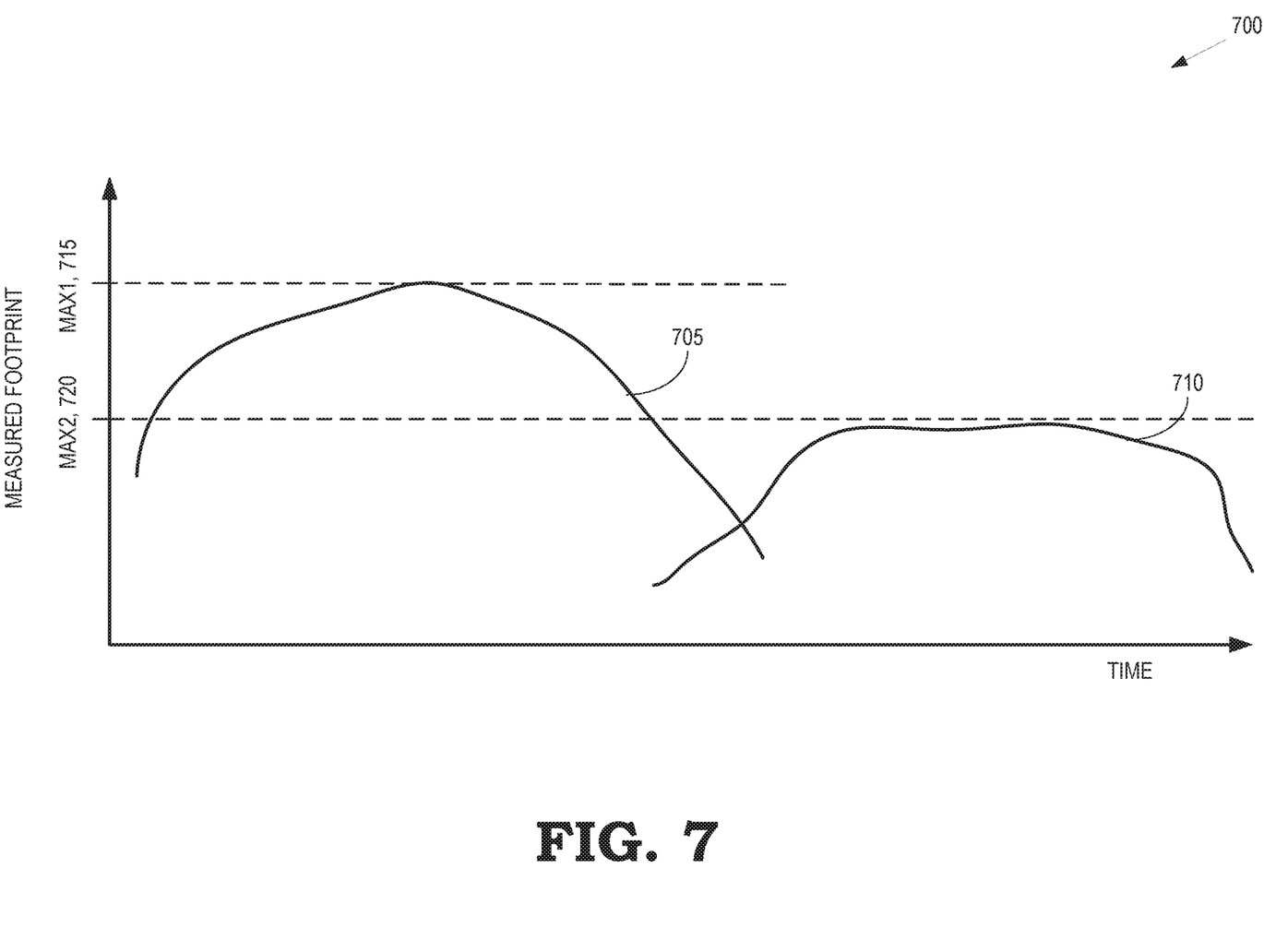
FIG. 7 is a plot of measured footprints of two different waves in a shared resource as a function of time according to some embodiments.

FIG. 7 is a plot 700 of measured footprints 705, 710 of two different waves in a shared resource as a function of time according to some embodiments. The measured footprints 705, 710 are illustrated as continuous lines in FIG. 7. However, in some embodiments the measured footprints 705, 710 are formed of multiple discrete measurements at particular time intervals such as a time interval corresponding to a predetermined number of execution cycles. The footprints 705, 710 are measured while the corresponding waves are executing on processor cores. The measured footprints 705, 710 are concurrent and offset in time. However, other measurements are not necessarily concurrent or offset in time. For example, in some cases the measured footprints 705, 710 are measured at different times or while the waves are executing on different processors.

The waves have different characteristics that result in the waves using different code paths, e.g., different execution paths within shaders of a GPU. For example, if the waves are executing on a pixel shader that is configured to shade two types of materials within a screen image, the pixel shader can operate differently when shading pixels corresponding to objects of the first or second material types, which results in waves used to shade the different pixels following different code paths through the pixel shader. Although characteristics relating to shading of different types of materials are used for illustrative purposes in this discussion, other characteristics of waves that result in different maximal footprints can also be used to distinguish between different types of waves.

Waves executing along the different code paths reach different maximal footprints in the shared resource. In the illustrated embodiment, a first wave that executes along a first code path reaches a first maximal footprint 715 and a second wave that executes along a second code path reaches a second maximal footprint 720, which is smaller than the first maximal footprint 715. The maximal footprints 715, 720 are determined by monitoring the footprints while the waves are executing on a processor core. Average footprints for waves that execute along the first code path (such as the first wave) are calculated by averaging maximal footprints (such as the first maximal footprint 715) for the waves. Average footprints for waves that execute along the second code path (such as the second wave) are calculated by averaging maximal footprints (such as the second maximal footprint 720) for the waves.

In some embodiments, the average maximal footprints for different types of waves are used to determine different numbers (or rates) of spawned waves depending on which type of wave is executing. For example, if a pixel shader is shading material of a first type, then an average maximal footprint for waves that execute along a corresponding first code path through the pixel shader are used to determine a number (or rate) of spawned waves. For another example, if the pixel shader is shading material of a second type, then an average maximal footprint for waves that execute along a corresponding second code path through the pixel shader are used to determine the number (or rate) of spawned waves. In the case discussed above, the average maximal footprint for the first type of wave is larger than the average maximal footprint for the second type of wave. Waves of the first type are therefore spawned in lower numbers (or at lower rates) than waves of the second type.

In some embodiments, the apparatus and techniques described above are implemented in a system comprising one or more integrated circuit (IC) devices (also referred to as integrated circuit packages or microchips), such as the computing system described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   measuring resource allocations of waves within resources that are shared by processor cores in a multithreaded processor concurrently with the waves executing on the processor cores;
   averaging, at the multithreaded processor, the resource allocations over a time interval; and
   spawning, at the multithreaded processor, a number of waves based on the average resource allocation and dispatching the spawned waves for execution in the multithreaded processor.

2. The method of claim 1, wherein measuring the resource allocations of the waves comprises measuring the resource allocations of the waves at times corresponding to at least one of creation of the waves, allocation of resources to the waves, deallocation of resources from the waves, or at time intervals corresponding to a predetermined number of execution cycles.

3. The method of claim 1, wherein measuring the resource allocations over the time interval comprises measuring maximal resource allocations of the waves while the waves are executing on the processor cores.

4. The method of claim 1, wherein measuring the resource allocations of the waves within the resources comprises measuring the resource allocations of the waves within the resources during a trailing time interval relative to a reference time.

5. The method of claim 4, wherein averaging the resource allocations over the time interval comprises generating a moving average of the resource allocations over the trailing time interval.

6. The method of claim 5, wherein spawning the number of waves comprises spawning the number of waves subsequent to the reference time based on the moving average of the resource allocations over the trailing time interval.

7. The method of claim 6, further comprising:
   modifying the number of waves that are dispatched for execution in response to a change in the moving average relative to a previous moving average over a previous trailing time interval.

8. The method of claim 1, wherein averaging the resource allocations comprises generating a plurality of average resource allocations for a plurality of subsets of the waves, and wherein spawning the number of waves comprises spawning a number of waves determined based upon the plurality of average resource allocations.

9. The method of claim 8, wherein the plurality of subsets of the waves comprise at least one of a subset of the waves that include single-instruction-multiple-data operations, a subset of waves that have completed execution, and a subset of waves corresponding to a type of shader executing the waves.

10. A processing system comprising:
    a plurality of processor cores; and
    a controller configured to spawn a number of waves for execution by the plurality of processor cores, wherein the number of waves spawned is determined using average values of measured resource allocations of waves within resources that are shared by waves that are executing on the plurality of processor cores.

11. The processing system of claim 10, wherein the resource allocations of the waves are measured at times corresponding to at least one of creation of the waves, allocation of resources to the waves, deallocation of resources from the waves, or at time intervals corresponding to a predetermined number of execution cycles.

12. The processing system of claim 10, wherein the measured resource allocations are measured maximal resource allocations of the waves while the waves are executing on the plurality of processor cores.

13. The processing system of claim 10, wherein the resource allocations of the waves are measured during a trailing time interval relative to a reference time.

14. The processing system of claim 13, wherein the average values of the measured resource allocations of waves is a moving average of the measured resource allocations over the trailing time interval.

15. The processing system of claim 14, wherein the controller is configured to spawn the number of waves subsequent to the reference time based on the moving average of the measured resource allocations over the trailing time interval.

16. The processing system of claim 15, wherein the controller is configured to modify the number of waves that are dispatched for execution in response to a change in the moving average relative to a previous moving average over a previous trailing time interval.

17. The processing system of claim 10, wherein the average values of the measured resource allocations comprises a plurality of average values of measured resource allocations for a plurality of subsets of the waves, and wherein the controller is configured to spawn a number of waves determined based upon the plurality of average values of the measured resource allocations.

18. The processing system of claim 17, wherein the plurality of subsets of the waves comprise at least one of a subset of the waves that include single-instruction-multiple-data operations, a subset of waves that have completed execution, and a subset of waves corresponding to a type of shader executing the waves.

19. A method comprising:
spawning, at a multithreaded processor, waves at a rate that is determined based on average values of resource allocations of waves within resources that are shared by the waves while executing on the processor;
dispatching the spawned waves for execution by processor cores in the multithread processor; and
modifying, at the multithreaded processor, a rate of spawning waves in response to a change in the average values of the resource allocations of the waves.

20. The method of claim 19, wherein modifying the rate of spawning waves comprises increasing the rate of spawning waves in response to the average values of the resource allocations of the waves decreasing and decreasing the rate of spawning waves in response to the average values of the resource allocations of the waves increasing.

* * * * *